US008301942B2

(12) United States Patent
Galbraith et al.

(10) Patent No.: US 8,301,942 B2
(45) Date of Patent: Oct. 30, 2012

(54) MANAGING POSSIBLY LOGICALLY BAD BLOCKS IN STORAGE DEVICES

(75) Inventors: Robert E. Galbraith, Rochester, MN (US); Adrian C. Gerhard, Rochester, MN (US); Daniel F. Moertl, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 476 days.

(21) Appl. No.: 12/421,671

(22) Filed: Apr. 10, 2009

(65) Prior Publication Data
US 2010/0262868 A1 Oct. 14, 2010

(51) Int. Cl.
*G11C 29/00* (2006.01)
(52) U.S. Cl. ...................................................... 714/723
(58) Field of Classification Search .................. 714/718, 714/723
See application file for complete search history.

(56) References Cited

U.S. PATENT DOCUMENTS

| | | | | |
|---|---|---|---|---|
| 5,740,349 | A * | 4/1998 | Hasbun et al. | 714/6.13 |
| 6,415,400 | B1 * | 7/2002 | Wu et al. | 714/723 |
| 6,877,118 | B2 * | 4/2005 | Oshima et al. | 714/719 |
| 6,885,956 | B2 * | 4/2005 | Baba | 702/83 |
| 7,024,598 | B2 * | 4/2006 | Jeong et al. | 714/704 |
| 7,434,122 | B2 * | 10/2008 | Jo | 714/723 |
| 7,454,671 | B2 * | 11/2008 | Adsitt | 714/719 |
| 7,502,970 | B2 * | 3/2009 | Aizawa | 714/42 |
| 7,571,362 | B2 * | 8/2009 | Pellicone et al. | 714/723 |
| 7,610,525 | B2 * | 10/2009 | Roohparvar | 714/723 |
| 7,661,043 | B2 * | 2/2010 | Sato | 714/723 |
| 7,793,035 | B2 * | 9/2010 | Oshima et al. | 711/103 |
| 7,881,133 | B2 * | 2/2011 | Hwang et al. | 365/200 |
| 2007/0201463 | A1 * | 8/2007 | Morita | 370/389 |

* cited by examiner

*Primary Examiner* — James C Kerveros
(74) *Attorney, Agent, or Firm* — Matthew C. Zehrer

(57) ABSTRACT

Methods and a computer program product related to the management of possibly logically bad blocks in storage devices are disclosed. A logically bad pattern is placed in a standard size data block if data associated with the data block has previously been stored or is waiting to be stored, but has subsequently become lost. The logical block address associated with the data block is stored in a bad block table. The possibly logically bad pattern is able to be detected, and the bad block table is checked to determine if the data block to be read is in fact Logically Bad. A data check response may be given if the logical block address is present in a Bad Block Table. The possibly logically bad pattern may have a first predefined data portion and a second predefined data portion and may be repeated to fill the standard size data block.

20 Claims, 6 Drawing Sheets

MANAGING POSSIBLY LOGICALLY BAD BLOCKS IN STORAGE DEVICES

FIELD OF THE INVENTION

The present invention generally relates to the storage of data. More specifically the present invention relates to storage devices that manage Logically Bad Blocks—data that has previously been stored, or is waiting to be stored, but that has subsequently become lost.

BACKGROUND OF THE INVENTION

A data storage device is a device for recording information. A storage device may hold information, process information, or both. Electronic data storage is storage which requires electrical power to store and retrieve that data. Electromagnetic data may be stored in either an analog or digital format on a variety of media. This type of data is considered to be electronically encoded data, whether or not it is electronically stored in a semiconductor device, since a semiconductor device was used to record it on its medium. Most electronically processed data storage media (including some forms of computer data storage) are considered permanent (non-volatile) storage, that is, the data will remain stored when power is removed from the device. In contrast, most electronically stored information within most types of semiconductor (computer chips) microcircuits are volatile memory, for it vanishes if power is removed.

A hard disk (HD) is one such example of a data storage device and is commonly referred to as a hard drive, hard disk, or fixed disk drive. A HD is a non-volatile storage device which stores digitally encoded data on rapidly rotating platters with magnetic surfaces. HDs were originally developed for use with general purpose computers. In the 21st century, applications for HD have expanded to include digital video recorders, digital audio players, personal digital assistants, digital cameras and video game consoles, and mobile phones. Also during this time, the need for large-scale, reliable storage, independent of a particular device, led to the introduction of embedded systems such as Redundant Array of Independent Disks (RAID) arrays, network attached storage (NAS) systems and storage area network (SAN) systems that provide efficient and reliable access to large volumes of data.

Random-access memory (usually known by its acronym, RAM) is a form of computer data storage and is embodied in various forms of different data storage devices. Today it takes the form of integrated circuits that allow the stored data to be accessed in any order. For example, a DIMM, or dual in-line memory module, comprises a series of dynamic random access memory integrated circuits. These modules are mounted on a printed circuit board and designed for use in personal computers, workstations, servers, or other equivalent electronic systems.

Flash memory is non-volatile electronic memory that can be electrically erased and reprogrammed and is also embodied in various forms of different data storage devices. It is a technology that is primarily used in memory cards and USB flash drives for general storage and transfer of data between computers and other digital products. It is a specific type of EEPROM (Electrically Erasable Programmable Read-Only Memory) that is erased and programmed in large blocks; in early flash the entire chip had to be erased at once. Flash memory costs far less than byte-programmable EEPROM and therefore has become the dominant technology wherever a significant amount of non-volatile, solid state storage is needed. Example applications include PDAs (personal digital assistants), laptop computers, digital audio players, digital cameras and mobile phones. It has also gained popularity in the game console market, where it is often used instead of EEPROMs or battery-powered SRAM for game save data. Flash memory is non-volatile and offers fast read access times (although not as fast as volatile DRAM memory used for main memory in PCs) and better kinetic shock resistance than hard disks. These characteristics explain the popularity of flash memory in portable devices.

A host controller, disk controller, storage device manager, etc. may connect a host system (the computer, the data processing system, or other electronic device) to the storage device. Host or disk controllers may contain electronics and firmware to execute and manage transactions between the host system and the storage device. A device driver, linked to the operating system may control the host or disk controller itself. Host or disk controllers may or may not be integrated into the storage device itself.

Storage devices may have trouble managing data that has previously been stored, or is waiting to be stored, but that has become lost—so called Logically Bad Blocks. Managing Logically Bad Blocks is useful for storage devices such as for example, storage adapters, spinning disk drives, solid state disk drives, etc. Managing Logically Bad Blocks may be of particular use to Flash based devices since a bad Flash segment can lose multiple blocks of data (e.g. a Flash segment may contain 64 512-byte blocks for non-continuous Logical Block Addresses (LBAs)).

Logically Bad Blocks may be created (i.e. data "lost") in a variety of situations. Some situations are described below (a non exhaustive list):

Logically Bad Blocks may be created when individual non volatile pages used for Write Cache are lost, as detected by Basic Assurance Tests or Power On Self Tests at Initial Program Load time.

Logically Bad Blocks may also be created in a compressed Write Cache where decompression errors are detected on the Write Cache destage operation, where the destage is either a normal destage or a stripe write destage.

Logically Bad Blocks may also be created if a Backup Cache Directory is kept in NVRAM and where a Backup Cache Directory is used to create bad blocks due to the loss of the Primary Cache Directory and Data.

Logically Bad Blocks may also be created if a block of user data is found unreadable from disk (i.e. a Data Check condition exists) and it is not possible to recreate the data utilizing RAID. This may occur, for example, when RAID-0 is used, when a RAID-5 array has another disk in the array which is failed, when a RAID-6 array has 2 other disks in the array which are failed, etc.

Logically Bad Blocks may also be created if a resynchronization of parity is required and one or more disks in an array are failed. This occurs, for example, at IPL time when an exposed RAID-5 array was abnormally powered off or reset while parity updates were in progress.

Logically Bad Blocks may also be created while rebuilding blocks of data for a failed/replaced disk protected by RAID-5, an unreadable block on another disk in the array is encountered. In this scenario both the data block to be rebuilt on the failed/replaced disk and the unreadable block on the otherwise operational disk are lost.

Logically Bad Blocks may also be created when utilizing an on-disk write cache. This cache provides a considerable performance gain for disk writes. However if the electronic system fails (power, OS crash, etc.), or if there is an uncorrectable memory error, there is a high probability there will be some data in the cache which was not written to the disk.

Managing Logically Bad Blocks have been solved by utilizing various methodologies described below:

One example of a storage device methodology to manage Logically Bad Blocks is to implement a table of Logically Bad Blocks (known as a Bad Block Table) for each logical or physical storage device and then search the table on each Read operation to determine if the any of the blocks to be read are Logically Bad. Software must ensure on each Read operation that the blocks being read are not Logically Bad. Additionally, software must also determine on each Write operation if any Logically Bad Blocks are to be removed. While this search can be quite quick when the number of Logically Bad Blocks is small, system performance may decrease as the number of Logically Bad Blocks increases. There is also the general complexity of maintaining the Bad Block Table non-volatilely.

Another example of a storage device methodology to manage Logically Bad Blocks is to use disk operations such as Read Long and Write Long to read data+ECC (Error Correction Codes) from the disk, corrupt the ECC kept by the disk, and rewrite the block of data+ECC back to disk so as to make the block readable. This approach has the disadvantages of counting on a disk to provide the Read Long and Write Long commands and having a storage adapter having the capability to understand of the type/amount of ECC being kept for each disk block. Another disadvantage is that this approach does not directly address the problem of a Logically Bad Block for a missing/failed disk in a RAID array (although some implementations may try to address this problem by corrupting the corresponding parity block).

Another example of a storage device methodology to manage Logically Bad Blocks is to place a unique pattern in the header of a data block which it guaranteed never to be written by the host. This unique pattern is known as the Logically Bad pattern. This has been the approach used by the Direct Attach Storage (DAS) adapters used by International Business Machine System i and System p products. A specific pattern is used in the 8-byte header of a data block that indicates the block is Logically Bad. While a host like the i5OS operating system may write the 8-byte header, the host will never use this particular pattern in normal operation. The header is always written as zeros for AIX and Linux hosts. Thus, the storage adapter has a unique indication it can place in any block to indicate it is Logically Bad. This approach requires a non standard disk block size (520 bytes or greater; 8-byte header+512-bytes data+other optional trailer bytes).

SUMMARY OF THE INVENTION

In various embodiments of the present invention, if data is lost a possibly logically bad pattern is placed in a standard size data block in a storage device, and the Logical Block Address associated with the data block is inserted in a Bad Block Table. The possibly logically bad pattern is detectable, and the Bad Block Table is checked to determine if the data block to be read is in fact Logically Bad. A data check response is given to a host if a Logical Block Address associated with the standard size data block is present in a Bad Block Table. The possibly logically bad pattern may have a first predefined data portion and a second predefined data portion and may be repeated the requisite number of instances to fill the standard size data block.

In another embodiment of the present invention, a method to determine if a Possibly Logically Bad Block is indeed Logically Bad is described. A host read operation of a storage device is initiated. A possibly logically bad pattern in a standard size data block within the storage device is detected. A data check response to the host is delivered if a Logical Block Address associated with the standard size data block is present in a Bad Block Table.

In another embodiment of the present invention, detecting the possibly logically bad pattern in a standard size data block within the storage device further comprises testing at least a subset of the standard size data block to determine if the contents of the subset match the possibly logically bad pattern.

In another embodiment of the present invention, the possibly logically bad pattern has a first predefined data portion and a second predefined data portion. In another embodiment of the present invention, the possibly logically bad pattern is repeated the requisite number of instances to fill the standard size data block. In another embodiment of the present invention, the first predefined data portion is the American Standard Code for Information Interchange (ASCII) representation for possibly logically bad. In another embodiment of the present invention, the hardware, software, or firmware, either alone or in any combination, of a storage manager that connects the host and the storage device, detects the possibly logically bad pattern. In another embodiment of the present invention, the storage manager is a storage adapter and the storage device is a plurality of hard disks.

In another embodiment of the present invention, a method that scans one or more data blocks in one or more storage devices that are known to have once contained a Possibly Logically Bad Block(s) and update a Bad Block table if is determined that there are no longer any Possibly Logically Bad Blocks in the region is described. A first standard size data block within a first storage device is scanned for a possibly logically bad pattern. The applicable Bad Block Table entry corresponding with the first standard size data block is removed if the possibly logically bad pattern is not detected.

In another embodiment of the present invention the scanning method further comprises scanning a second standard size data block within the first storage device for a possibly logically bad pattern if the first standard size data block was not the last data block in the first storage device that was scanned. In another embodiment of the present invention the scanning method further comprises scanning a first standard size data block within a second storage device for a possibly logically bad pattern if the second standard size data block within the first storage device was the last data block in the first storage device that was scanned.

In another embodiment of the present invention, a computer program product for managing possibly logically bad blocks is described. The computer program product includes computer-executable logic embodied in signal-bearing media, where the computer-executable logic allows for a computer to perform the steps of detecting a possibly logically bad pattern in a standard size data block within the storage device and delivering a data check response to the host if a Logical Block Address associated with the standard size data block is present in a Bad Block Table.

In another embodiment the approach for managing Logically Bad Blocks works with standard device blocksizes sizes such as 512-bytes or 4096-bytes. In another embodiment, the approach for managing Logically Bad Blocks does not affect the XOR and finite field multiply (FFM) operations performed as part of RAID function. In another embodiment, the approach for managing Logically Bad Blocks does not affect the compression and decompression operations performed as part of compressed write cache or compressed read cache function.

This and other features, aspects, and advantages will become better understood with reference to the following description, appended claims, and accompanying drawings.

BRIEF DESCRIPTION OF THE DRAWINGS

So that the manner in which the above recited features of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Figure 1:
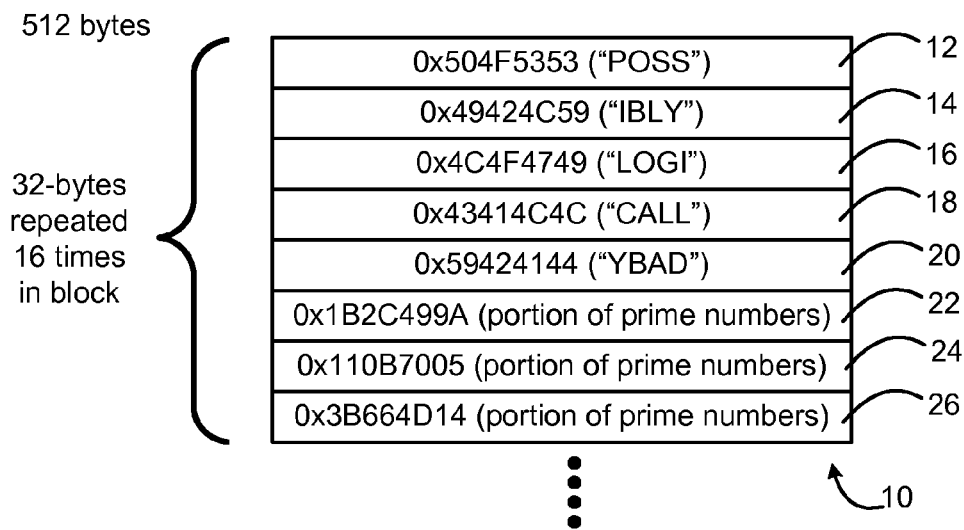
FIG. 1 depicts a Possibly Logically Bad Block pattern that may be written to a storage device, according to an embodiment of the present invention.

For a better understanding of the various embodiments of the present invention, together with other and further features and advantages thereof, reference is made to the following description, taken in conjunction with the accompanying drawings, and the scope of the invention will be asserted in the claims.

It will be readily understood that the components of the present invention, as generally described and illustrated in the Figures herein, may be arranged and designed in a wide variety of different configurations. Thus, the following more detailed description of the embodiments of the apparatus, system, and method of the present invention, as represented in FIGS. 1 through 7, is not intended to limit the scope of the invention, as claimed, but is merely representative of selected embodiments of the invention.

As will be appreciated by one skilled in the art, various embodiments of the present invention may be embodied as a system, method, computer program product or any combination thereof. Accordingly, various embodiments of the present invention may take the form of an entirely hardware embodiment, an entirely software embodiment (including firmware, resident software, micro-code, etc.) or an embodiment combining software and hardware aspects that may all generally be referred to, for example as a "circuit," "module" or "system." Furthermore, various embodiments of the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electro-magnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Electronic or computer program code for carrying out operations of various embodiments of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer (or other data processing machine, or other electronic system) partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "computer" is used for example to refer to a data processing device. Therefore, in some embodiments, the "computer" reference may be interchangeable with other electronic device references. Such devices being for example a server, digital video recorder, digital audio players, personal digital assistants, digital cameras, video game consoles, mobile/smart phones, etc.

Reference throughout this specification to "one embodiment" or "an embodiment" (or the like) means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment. In addition, features described in connection with a particular embodiment may be combined or excluded from other embodiments described herein.

Embodiments of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

An exemplary data processing system may comprise: a processor which may comprise a digital signal processor (DSP), central processing unit (CPU), microcontroller, microprocessor, microcomputer, ASIC or FPGA core. The data processing system may also comprise static read only memory and dynamic main memory all in communication with the processor. The processor may also be in communication, for example via a bus, with a number of peripheral devices that are also included in the computer system. Peripheral devices coupled to the bus may include for example a display device (e.g., monitor), alpha-numeric input device (e.g., keyboard) and pointing device (e.g., mouse, tablet, etc.)

The data processing system may be connected to one or more external networks such as a LAN or WAN via communication lines connected to the system via data I/O communications interface (e.g., network interface card or NIC). The network adapters coupled to the data processing system enable the data processing system to become coupled to other data processing systems or remote printers or storage devices through intervening private or public networks. Modems, cable modem and Ethernet cards are just a few of the currently available types of network adapters. The system may also comprise magnetic, semiconductor based, or other such storage device(s) for storing application programs and data. The system may also comprise a computer readable storage medium that may include any suitable memory means, including but not limited to, magnetic storage, optical storage, semiconductor volatile or non-volatile memory, biological memory devices, or any other memory storage device.

Software is adapted to reside on a computer readable medium, such as a magnetic disk within a disk drive unit. Alternatively, the computer readable medium may comprise a floppy disk, removable hard disk, Flash memory, EEROM based memory, bubble memory storage, ROM storage, distribution media, intermediate storage media, execution memory of a computer, and any other equivalent medium or device capable of storing for later reading by a computer a computer program implementing the method of this invention. The software may also reside, in whole or in part, in the static or dynamic main memories or in firmware within the processor of the computer system (i.e., within microcontroller, microprocessor or microcomputer internal memory).

Other digital computer system configurations can also be employed to implement various embodiments of the present invention, and to the extent that a particular system configuration is capable of implementing various embodiments, it is equivalent to the described exemplary digital computer system of and within the spirit and scope of this invention.

Once they are programmed to perform particular functions pursuant to instructions from program software that implements the system and methods of this invention, such digital processing systems in effect become special purpose computers particular to allow for the execution of various embodiments of this invention.

It is noted that computer programs implementing the system and methods of this invention will commonly be distributed to users on a distribution medium such as floppy disk or CD-ROM or may be downloaded over a network such as the Internet using FTP, HTTP, or other suitable protocols. From there, they will often be copied to a hard disk or a similar intermediate storage medium. When the programs are to be run, they will be loaded either from their distribution medium or their intermediate storage medium into the execution memory of the computer, configuring the computer to act in accordance with the method of this invention.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

FIG. 1 depicts an embodiment of the present invention where a pattern is written to a standard data block of a storage device. When data is stored to a storage device the data is said to be "written" to the storage medium. In the case of a non-volatile storage device, this data is stored to be utilized, or read from the storage device at a later time. The pattern may be written to the storage device when it is deemed that the data block as containing Possibly Logically Bad data.

In some embodiments, the pattern written to the storage device should be unlikely to occur in a normal host environment. A particular exemplary pattern shown in FIG. 1 is comprised of a repeating pattern of 32-bytes which includes the ASCII representation of "POSSIBLYLOGICALLY-BAD" and portions of prime numbers. While a host system may write this pattern, it would be uncommon to do so. In other embodiments, another pattern of predetermined value (s) may be utilized.

FIG. 1 depicts a data block 10 of a standard data block size (i.e. 512 bytes, 4096 bytes, etc.). Data block 10 comprises data segments (12, 14, 16, 18, 20, 22, 24, 26, etc.) that store data. When a Logically Bad Block is created a pattern in written to data block 10. In the exemplary embodiment the pattern is created by writing "0x504F5353" to data segment 12 which is the ASCII representation of "POSS", "0x49424C59" to data segment 14 which is the ASCII representation of "IBLY", "0x4C4F4749" to data segment 16 which is the ASCII representation of "LOGI", "0x43414C4C" to data segment 18 which is the ASCII representation of "CALL", "0x59424144" to data segment 120 which is the ASCII representation of "YBAD". Any predefined portion of prime numbers may be written to data segments 22, 24, and 26 to create for example a 32 byte block. This 32 byte block may be repeated the necessary number of times to fill data block 10. In the exemplary embodiment where data block 10 is a 512 byte data block, the 32 byte pattern is repeated 16 times.

Figure 2:
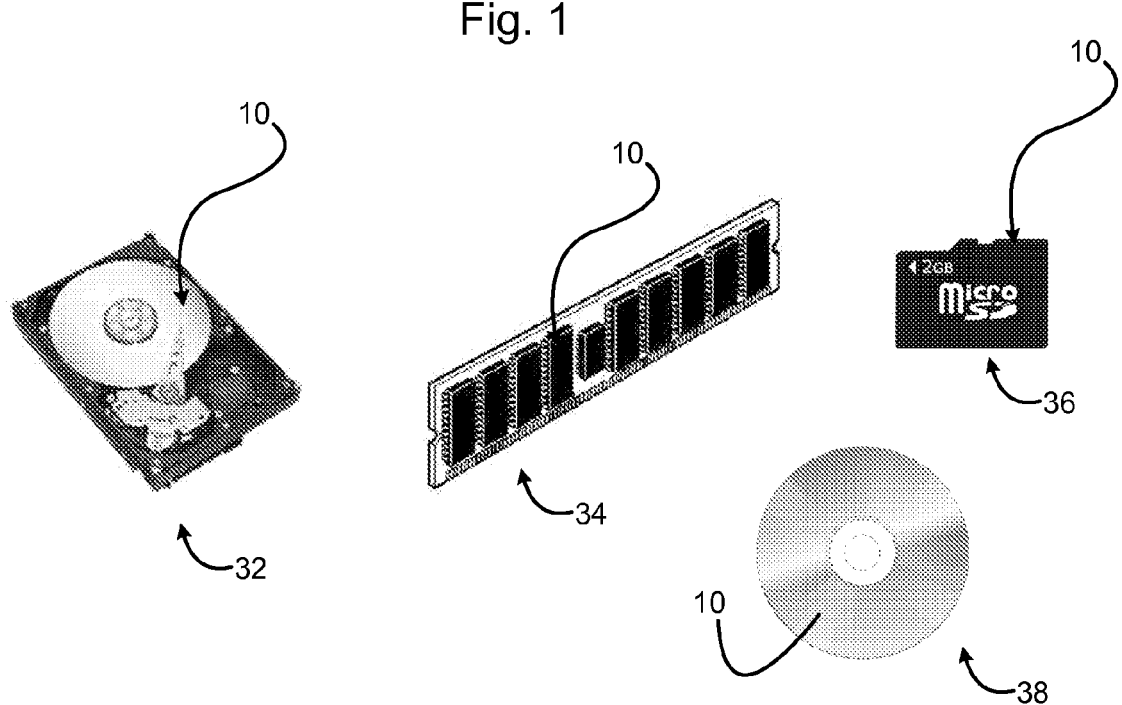
FIG. 2 depicts exemplary types of computer storage media, storage devices, computer program products, etc. where the Possibly Logically Bad Block pattern may be written.

FIG. 2 depicts exemplary different storage devices comprising computer-usable or computer-readable medium utilized to store data. Such exemplary storage devices may be a hard drive 32, memory module 34, flash media 36, or CD 38. Data block 10, or other Possibly Logically Bad software code portions (described below) may be written to for example hard drive 32, memory module 34, flash media 36, or CD 38. The computer-usable or computer-readable medium utilized in such storage devices may be, for example but not limited to, an electronic, magnetic, optical, electromagnetic, infrared, or semiconductor system, apparatus, device, or propagation medium. More specific examples (a non-exhaustive list) of the storage devices utilizing a computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, an optical storage device, a transmission media such as those supporting the Internet or an intranet, or a magnetic storage device.

Figure 3:
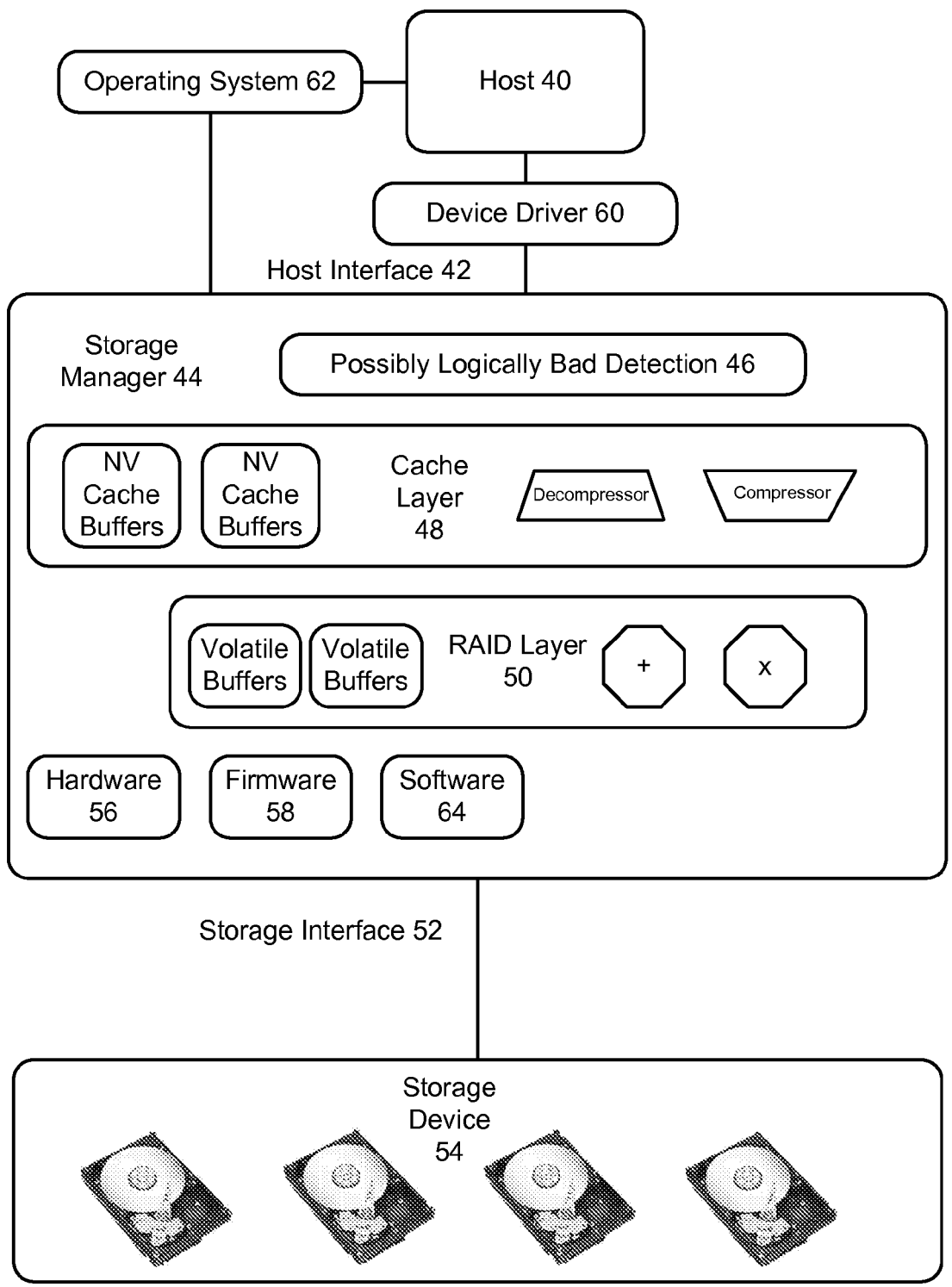
FIG. 3 depicts a block diagram of a host controller, disk controller, or other such equivalent storage manager that connects a host system (the computer, the data processing system, or other electronic device) to the storage device.

FIG. 3 depicts a block diagram of an exemplary architecture to manage Possibly Logically Bad Blocks. FIG. 3 depicts for example a host 40, host interface 42, storage manager 44, storage interface 52 and a storage device 54. The storage manager comprises Possibly Logically Bad Detection logic 46 and in certain embodiments may also comprise a cache layer 48 and/or RAID layer 50.

Storage manager 44 connects host 40 (e.g. computer, data processing device, server, digital video recorder, digital audio player, personal digital assistant, digital camera, video game console, mobile/smart phones, etc.) to storage device 54 via host interface 42. Storage manager 44 may be for example a host controller, a host adapter, a host bus adapter (HBA), a microcontroller or other type of integrated circuit, etc. Storage manager 44 may comprise electronics 56, firmware 58, and/or software 64 to execute and manage transactions between the host 40 and the storage device 54. In certain embodiments, a device driver 60 linked to an operating system 62 and may control the storage manager 44.

Device driver 60 may be a computer program allowing higher-level computer programs to interact with a hardware device (i.e., storage device 54). Device driver 60 may communicate with the hardware device through the computer bus or communications subsystem to which the hardware is connected (i.e., host interface 42, etc.). When a calling program invokes a routine in the device driver 60, the device driver 60 issues commands to the hardware device. Once the device sends data back to the driver, the driver may invoke routines in the original calling program.

In certain embodiments the storage manager 44 may or may not be integrated into the storage device itself.

Within the storage manger 44, Possibly Logically Bad Detection 46 is used to detect the "POSSIBLYLOGICALLY-BAD" pattern whenever data is transferred to the host on a Read operation. In certain embodiments software 64 does not need to do any checking to determine if the Possibly Logically Bad Block is actually Logically Bad on each and every Read operation. In other words, hardware 56 checks to determine if the "POSSIBLYLOGICALLYBAD" pattern exists. However, in certain embodiments, software 64 may check to determine on each Read operation if the block to be read is Possibly Logically Bad. In other embodiments, Possibly Logically Bad Detection 46 may be embodied in hardware (i.e. electronics 56), software 64, firmware 58, or a combination of hardware, software, and/or firmware. In certain embodiments, if a Possibly Logically Bad Block is detected by Possibly Logically Bad Detection 46, software 64 may do a secondary inquiry to determine if the Possibly Logically Bad Block is actually Logically Bad.

In a particular embodiment, the secondary inquiry to determine if the Possibly Logically Bad Block is actually Logically Bad may be completed by inquiring a Bad Block Table. The Bad Block Table that may be utilized in various embodiments of the present invention is a listing, datasheet, or other such data table of the Logically Block Addresses of the actual Logically Bad Blocks. The Bad Block Table utilized in embodiments of the present invention need not be interrogated on each read operation. The Bad Block Table utilized in embodiments of the present invention is interrogated if it is determined that the data block read, or to be read, is a Possibly Logically Bad Block.

In other embodiments, the Bad Block Table may keep a minimal amount of data but still have the ability to effectively identify an individual Logically Bad Block. For example, it may be acceptable for the Bad Block Table to track only what parity stripes (i.e. larger region, multiple data blocks, etc) having some non-zero numbers of Logically Bad Blocks. It is possible for a block of data written by the host to be mistaken for a Logically Bad Block when in fact it is not. That is to say, if the host writes a block with a pattern matching the "POSSIBLYLOGICALLYBAD" pattern to a region marked as having some non-zero number of Logically Bad Blocks then a host read of this same block would indicate a Logically Bad block. It is therefore possible using statistical analysis to determine the granularity of the Bad Block Table to determine what is acceptable for a particular implementation. In another words the logic in making the Bad Block Table may be able to learn how little data is needed to be kept and still have the ability to identify an individual Logically Bad Block.

In certain embodiments, therefore, a Logically Bad Block is detected if a Possibly Logically Bad Block is detected by Possibly Logically Bad Detection 46, and software 64 determines that the Possibly Logically Bad Block is actually Logically Bad. In other words, a Logically Bad Block is detected only if both a Possibly Logically Bad is detected by the hardware and the Bad Block Table indicates the general region of the disk is known to contain a Logically Bad block.

Figure 4:
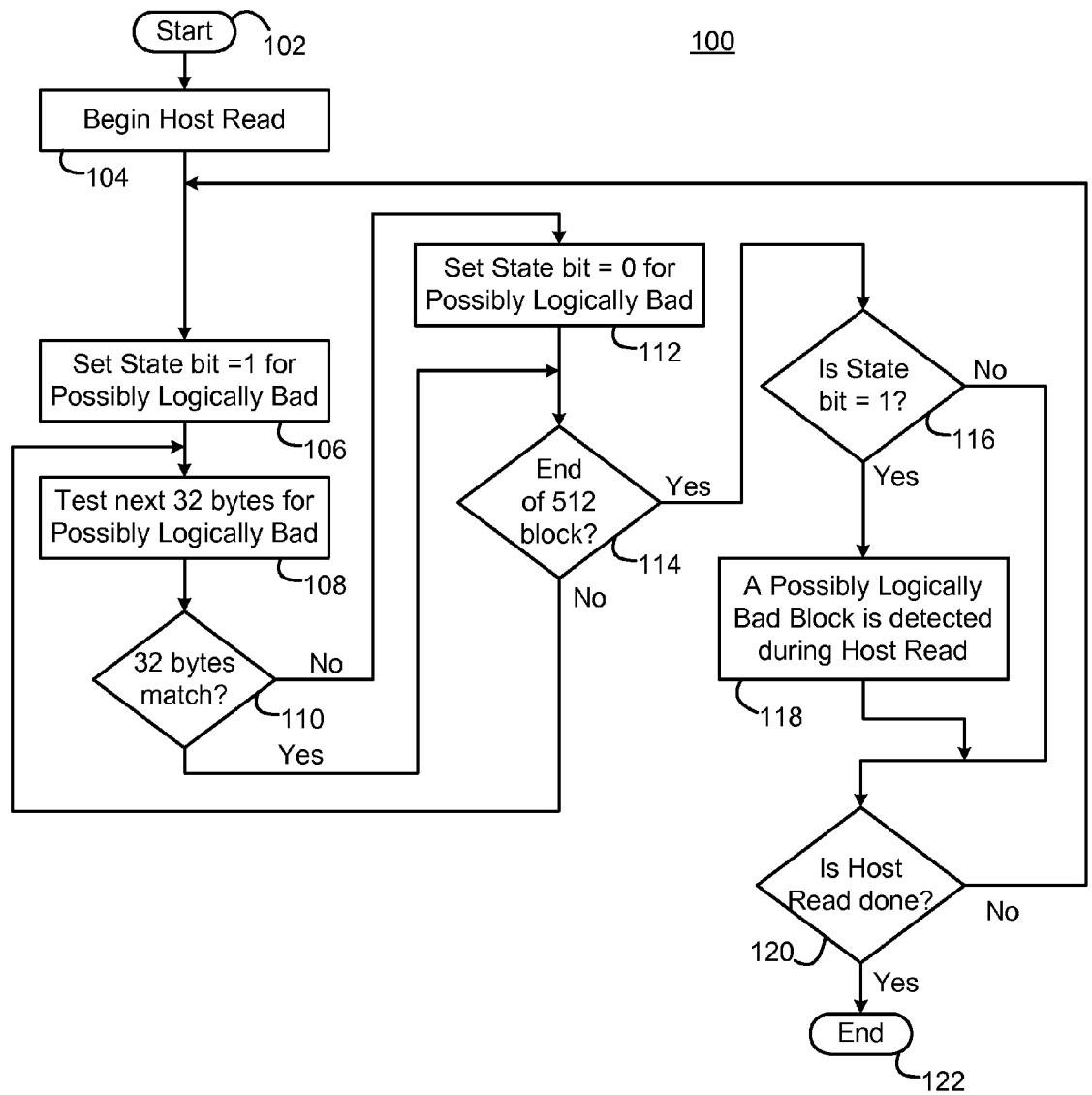
FIG. 4 depicts a flow chart of the logic that may be utilized to determine if the data block that a host is attempting to read is a Possibly Logically Bad Block, according to an embodiment of the present invention.

FIG. 4 depicts a flow chart of Possibly Logically Bad Logic 100 that may be utilized to determine if the data block(s) that a host is attempting to read is a Possibly Logically Bad Block, according to an embodiment of the present invention. The exemplary Possibly Logically Bad Logic 100 shown in FIG. 4 is utilized by Possibly Logically Bad Detection 46. In other embodiments Possibly Logically Bad Detection 46 may use some alternative logic. Possibly Logically Bad Logic 100 starts at block 102. The host initiates a read operation (block 104). A first data block is identified and state bit is set to "1" (block 106). The next 32 bytes are examined to determine if data in the respective data block contain the "POSSIBLY-LOGICALLYBAD" pattern (block 108). It is determined If the respective data block contain the "POSSIBLYLOGICAL-LYBAD" pattern, by determining whether the 32 bytes match (block 110). If the 32 bytes match it is determined if it is the end of the 512 byte block (block 114). If the 32 bytes does not match the state bit is set to "0" (block 112) and it is determined if it is the end of the 512 byte block (block 114). If it is determined it is not the end of the 512 byte block the process proceeds back to block 108. If it is determined if is the end of the 512 byte block, it is determined if the state bit is set to "1" (block 116). If it is determined that the state bit is set to "1" a Possibly Logically Bad Block is detected during the host read operation (block 118). After a Possibly Logically Bad Block is detected, or if the state bit is not set to "1", it is determined if the host read operation is complete (block 120). If it is complete, Possibly Logically Bad Logic 100 ends at block 122. If it is not complete, Possibly Logically Bad Logic 100 proceeds to block 106.

Figure 5:
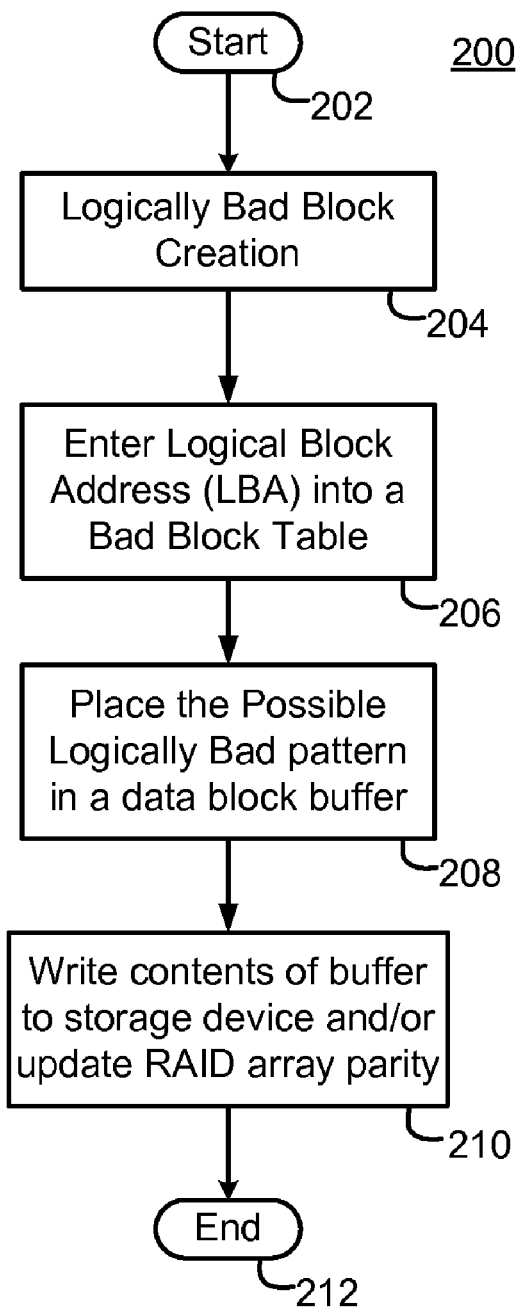
FIG. 5 depicts a flow chart of a method to create a Logically Bad Block by imbedding a Possibly Logically Bad Indication into a standard data block (i.e. 512 byte, 4096 byte), according to an embodiment of the present invention.

FIG. 5 depicts a flow chart of a method to create a Logically Bad Block 200 by imbedding a Possibly Logically Bad Indication into a standard data block (i.e., 512 byte, 4096 byte, etc.), according to an embodiment of the present invention. The method to create a Logically Bad Block 200 starts at block 202. For a variety of situations where data may be "lost", it is determined that a Logically Bad Block needs to be created (block 204). Logically Bad Blocks may be created in a variety of situations, some of which are described below. If data has been lost for a particular block the Logical Block Address is written or otherwise entered into a Bad Block Table (block 206). The "POSSIBLYLOGICALLYBAD" pattern is then written or otherwise entered into the applicable data block buffer (block 208). The contents of the applicable data block buffer are written to the storage device and/or the RAID array parity is updated (block 210). When the contents of the applicable data block are written to the storage device and/or the RAID array parity is updated, the method to create a Logically Bad Block 200 ends at block 212.

Referring to block 204 where it is determined if data has been lost for a particular data block (i.e. a Logically Bad Block is created). Logically Bad Blocks may be created in a variety of situations, some situations are described as follows (not an exhaustive list):

Logically Bad Blocks may be created when individual non volatile pages used for Write Cache are lost, as detected by Basic Assurance Tests or Power On Self Tests at Initial Program Load time.

Logically Bad Blocks may also be created in a compressed Write Cache where decompression errors are detected on the Write Cache destage operation, where the destage is either a normal destage or a stripe write destage.

Logically Bad Blocks may also be created if a Backup Cache Directory is kept in NVRAM and where a Backup Cache Directory is used to create bad blocks due to the loss of the Primary Cache Directory and Data.

Logically Bad Blocks may also be created if a block of user data is found unreadable from disk (i.e., a Data Check condition exists) and it is not possible to recreate the data utilizing RAID. This may occur, for example, when RAID-0 is used, when a RAID-5 array has another disk in the array which is failed, when a RAID-6 array has 2 other disks in the array which are failed, etc.

Logically Bad Blocks may also be created if a resynchronization of parity is required and one or more disks in an array are failed. This occurs, for example, at IPL time when an exposed RAID-5 array was abnormally powered off or reset while parity updates were in progress.

Logically Bad Blocks may also be created while rebuilding blocks of data for a failed/replaced disk protected by RAID-5, an unreadable block on another disk in the array is encountered. In this scenario both the data block to be rebuilt on the failed/replaced disk and the unreadable block on the otherwise operational disk are lost.

Logically Bad Blocks may also be created when utilizing an on-disk write cache. This cache provides a considerable performance gain for disk writes. However, if the electronic system fails (power, OS crash, etc.), or if there is an uncorrectable memory error, there is a high probability there will be some data in the cache which was not written to the disk.

Figure 6:
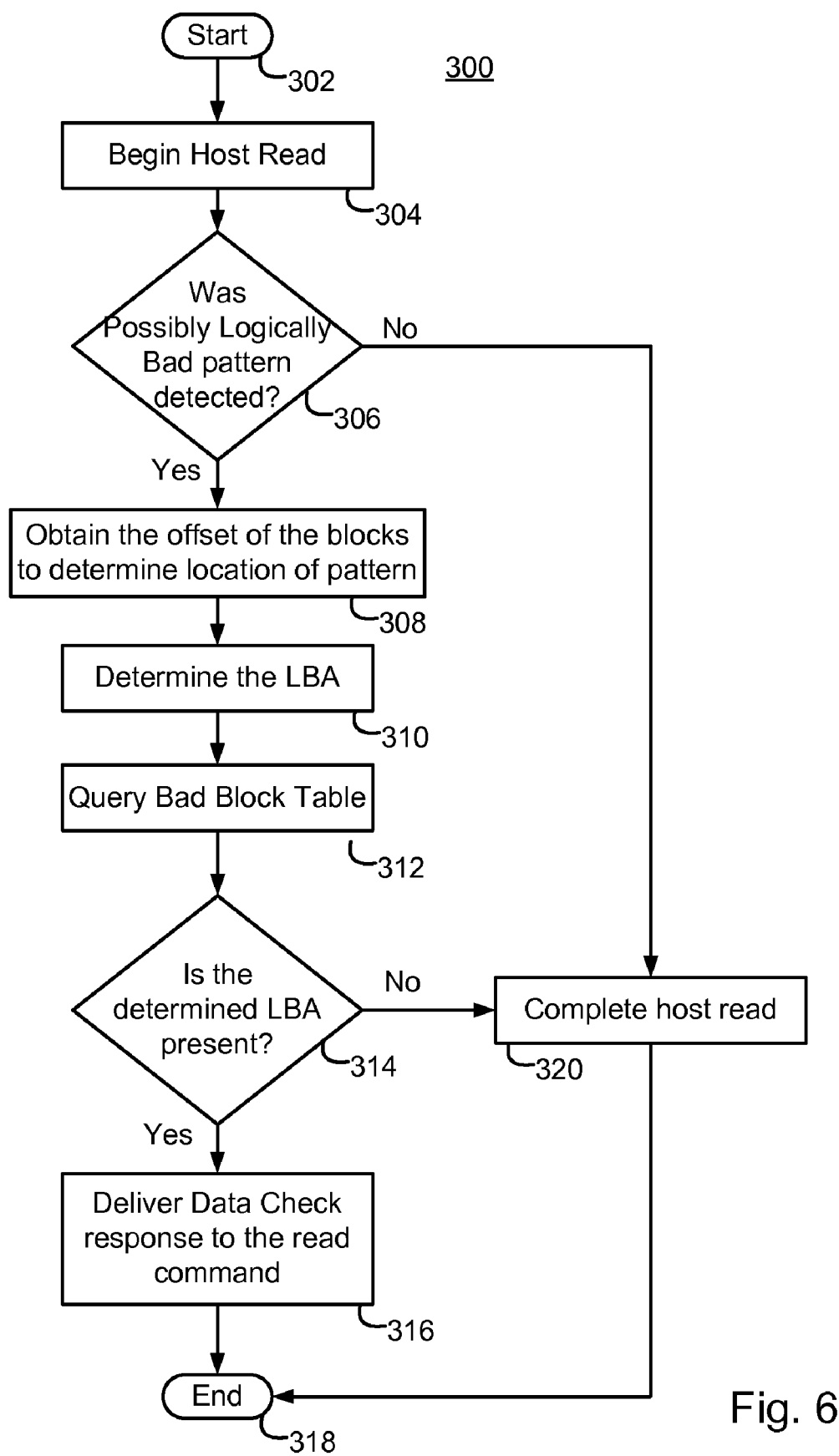
FIG. 6 depicts a flow chart of a method to determine if a Possibly Logically Bad Block is indeed actually Logically Bad, according to an embodiment of the present invention.

FIG. 6 depicts a method to determine if a Possibly Logically Bad Block is indeed actually Logically Bad 300, according to an embodiment of the present invention. The method to determine if a Possibly Logically Bad Block is indeed actually Logically Bad 300 starts at block 302. A host read operation of a storage device is initiated (block 304). It is determined whether the "POSSIBLYLOGICALLYBAD" pattern is detected (block 306). If the pattern is detected, an offset of the block is determined (block 308). When a Possibly Logically Bad Block is detected by the hardware, either the hardware can provide an offset to the first occurrence of the pattern, or alternatively, the software can interrogate the storage device or destination of the transfer to determine the first block with the pattern.

The Logical Block Address of the applicable Possibly Logically Bad Block is determined (block 310). The Bad Block Table is queried (block 312) to determine if the Logical Block Address is in the Bad Block Table (block 314). If the Logical Block Address is in the Bad Block Table, a data check response is delivered to the host (block 316). If the Logical Block Address is not in the Bad Block Table, or if the "POSSIBLYLOGICALLYBAD" pattern was not detected, the host read operation is completed (block 320). The method to determine if a Possibly Logically Bad Block is indeed actually Logically Bad 300 ends at block 318.

In certain embodiments, if and when the host reads a Logically Bad Block, it may be given a Data Check response. During the data check the data quality or data integrity may be verified prior to data utilization. If, for example, the data check results in the determination that the data to be read or otherwise utilized is expected to be Logically Bad the data is not utilized.

In certain embodiments of the invention, when the host performs a Write operation over a previously Logically Bad Block, the Logically Bad Block is automatically removed. In other words, the host writes a pattern other than the "POSSIBLYLOGICALLYBAD" pattern to the previously Logically Bad Block. The software 64 need not immediately update the Bad Block Table, but could instead have a background process which scans the regions which are known to once have contained a Possibly Logically Bad Block and updates the table should it find there are no longer any Possibly Logically Bad Blocks in the region. An exemplary flow chart of this background process is shown in FIG. 7.

Figure 7:
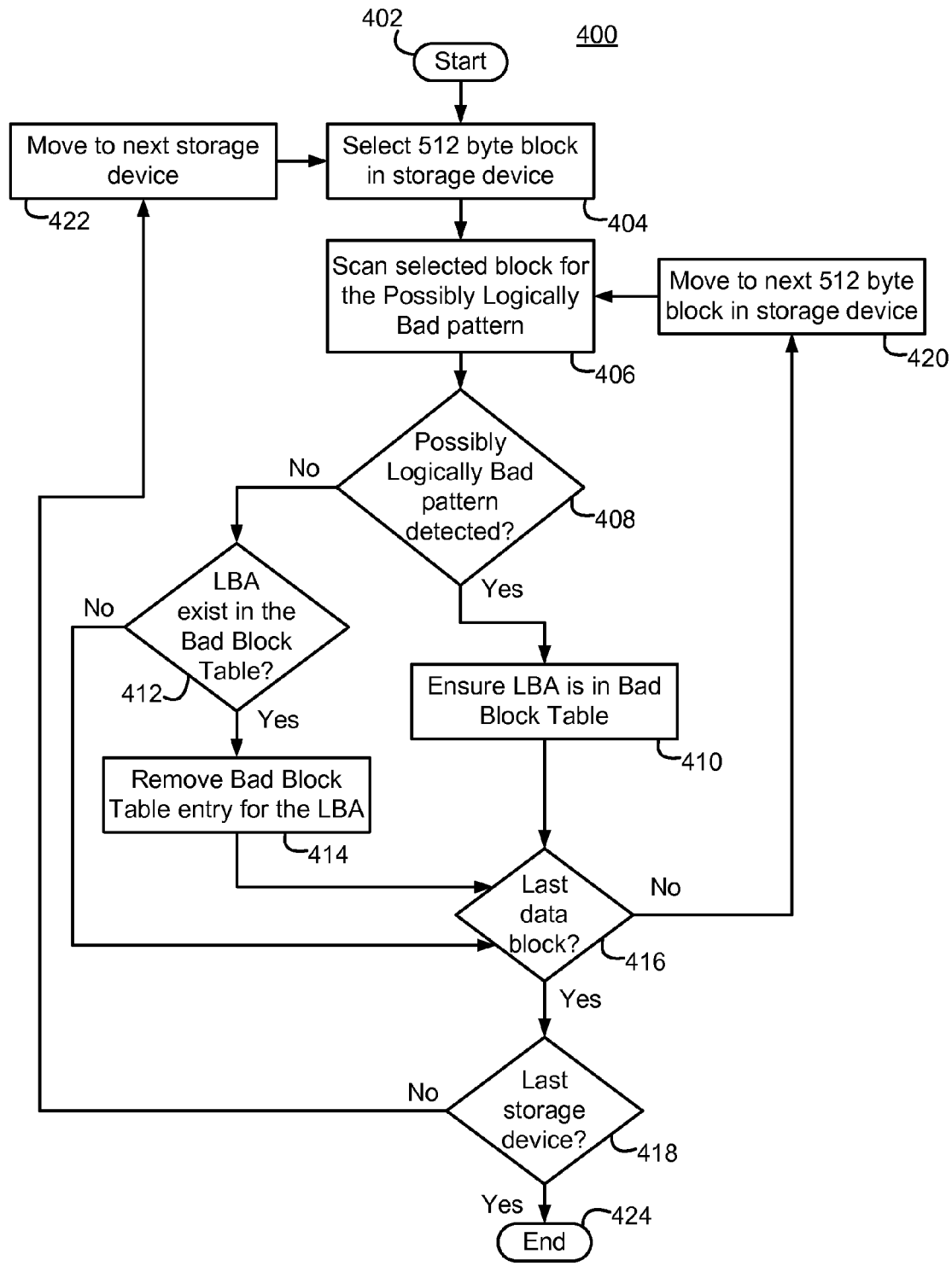
FIG. 7 depicts a flow chart of a scanning method used to scan one or more data blocks in one or more storage devices that are known to contain a Possibly Logically Bad Block(s) and update a Bad Block table if is determined that the Possibly Logically Bad Block(s) are not Logically Bad, according to an embodiment of the present invention.

FIG. 7 depicts a flow chart of a scanning method 400 used to scan one or more data blocks in one or more storage devices that are known to have once contained a Possibly Logically Bad Block(s) and update a Bad Block table if is determined that there are no longer any Possibly Logically Bad Blocks in the region, according to an embodiment of the present invention. Scanning method 400 starts at block 402. Within a first storage device a data block of a standard size is chosen (block 404). The chosen block may be a block located in an area of the storage device that is known to once have contained a Possibly Logically Bad Block. The selected block is scanned, queried, or otherwise checked for the "POSSIBLYLOGI-CALLYBAD" pattern (block 406). It is determined if the "POSSIBLYLOGICALLYBAD" pattern is detected within the selected block (block 408). In certain embodiments, If the pattern is detected the Bad Block Table may be queried to ensure that the Logical Block Address is present (block 410). If the pattern is not detected, it is determined whether the Logical Block Address is present in the Bad Block Table (block 412). If the Logical Block Address is present in the Bad Block Table, the entry in the Bad Block Table associated with the Logical Block Address is removed from the Bad Block Table (block 414). Referring back to block 412, If the Logical Block Address is not present in the Bad Block Table, it is determined if the chosen block is the last data block to be scanned (block 416). Referring back to block 414, if the entry in the Bad Block Table associated with the Logical Block Address is removed from the Bad Block Table, it is determined if the chosen block is the last data block to be scanned (block 416). Referring back to block 410, after the Bad Block Table is queried to ensure that the Logical Block Address is present, it is determined if the chosen block is the last data block to be scanned (block 416).

If the chosen block is not the last data block to be scanned, a second data block in the first storage device is chosen (block 420). Scanning method 400 then proceeds back to block 406. If the chosen block is the last data block to be scanned in the first storage device, it is determined if the first storage device is the last storage device to be scanned (block 418). If the first storage device is the last storage device to be scanned, scanning method 400 ends at block 424. If the first storage device is not the last storage device to be scanned, a second storage device is selected (block 422). Scanning method 400 then proceeds back to block 404.

In another embodiment of the invention, storage manager 44 may detect a "POSSIBLYLOGICALLYBAD" pattern when data is transferred from the host on a Write operation. This present embodiment allows the Bad Block Table to be quickly and accurately kept current to avoid the situation of a Logical Block Address being present in the Bad Block Table even though the applicable data block is not in fact Logically Bad. For example, using this enhancement with a very granular Bad Block Table (where it could identify an individual LBA, etc.) the storage manager could avoid all immediate checking/updating of the Bad Block Table on host Read/Write operations (unless the hardware detects a "POSSIBLY-LOGICALLYBAD" pattern) without misdirecting a Logically Bad Block.

In another embodiment, the approach for managing Logically Bad Blocks does not affect the XOR and finite field multiply (FFM) operations performed as part of RAID function. That is, the "POSSIBLYLOGICALLYBAD" pattern is treated the same as any other data with respect to XOR and FFM operations. In is also noted that parity blocks in a RAID array may contain the "POSSIBLYLOGICALLYBAD" pattern as the result of XOR and FFM operations performed on the associated redundant data blocks.

In another embodiment, the approach for managing Logically Bad Blocks should not affect the compression and decompression operations performed as part of compressed write cache or compressed read cache function. That is, the "POSSIBLYLOGICALLYBAD" pattern is treated the same as any other data with respect to compression or decompression operations.

In another embodiment, the approach for managing Logically Bad Blocks does not limit the number of Logically Bad Blocks which could exist. That is, the "POSSIBLYLOGI-CALLYBAD" pattern can be written to each data block for which the data has been "lost", and the Bad Block Table can be designed to accommodate variable sized regions.

It is to be understood that the present invention, in accordance with at least one present embodiment, includes elements that may be implemented on at least one electronic enclosure, such as general-purpose server running suitable software programs.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

The accompanying figures and this description depicted and described embodiments of the present invention, and features and components thereof. Those skilled in the art will appreciate that any particular program nomenclature used in this description was merely for convenience and, thus, the invention should not be limited to use solely in any specific application identified and/or implied by such nomenclature. Thus, for example, the routines executed to implement the embodiments of the invention, whether implemented as part of an operating system or a specific application, component, program, module, object, or sequence of instructions could have been referred to as a "program", "application", "server", or other meaningful nomenclature. Therefore, it is desired that the embodiments described herein be considered in all respects as illustrative, not restrictive, and that reference be made to the appended claims for determining the scope of the invention.

The invention claimed is:

1. A method for managing Logically Bad Blocks comprising:
   initiating a host read operation of a storage device;
   detecting a logically bad pattern in a standard size data block within the storage device; and
   delivering a data check response to the host if a Logical Block Address associated with the standard size data block is present in a Bad Block Table.

2. The method of claim 1 wherein detecting the logically bad pattern in a standard size data block within the storage device further comprises:
   testing at least a subset of the standard size data block to determine if the contents of the subset match the logically bad pattern.

3. The method of claim 2 wherein the logically bad pattern has a first predefined data portion and a second predefined data portion.

4. The method of claim 3 wherein the logically bad pattern is repeated the requisite number of instances to fill the standard size data block.

5. The method of claim 4 wherein the first predefined data portion is the American Standard Code for Information Interchange (ASCII) representation for "POSSIBLYLOGICALLYBAD".

6. The method of claim 5 wherein a storage manager that connects the host and the storage device, detects the logically bad pattern.

7. The method of claim 6 wherein the storage manager is a storage adapter and the storage device is a plurality of hard disks.

8. A method comprising:
scanning a first standard size data block within a first storage device for a logically bad pattern; and
removing an applicable Bad Block Table entry corresponding with the first standard size data block if a Logical Block Address of the first standard size data block is present in a Bad Block Table.

9. The method of claim 8 further comprising:
scanning a second standard size data block within the first storage device for a logically bad pattern if the first standard size data block was not the last data block in the first storage device that was scanned.

10. The method of claim 9 further comprising:
scanning a first standard size data block within a second storage device for a logically bad pattern if the second standard size data block within the first storage device was the last data block in the first storage device that was scanned.

11. The method of claim 10 wherein the logically bad pattern has a first predefined data portion and a second predefined data portion.

12. The method of claim 11 wherein the logically bad pattern is repeated the requisite number of instances to fill the standard size data block.

13. The method of claim 12 wherein the first predefined data portion is the American Standard Code for Information Interchange (ASCII) representation for "POSSIBLYLOGICALLYBAD".

14. A computer program product for managing logically bad blocks, said computer program product including computer-executable logic embodied in signal-bearing storage media, wherein said computer-executable logic allows for a computer to perform the steps of:
detecting a logically bad pattern in a standard size data block within the storage device; and
delivering a data check response to the host if a Logical Block Address associated with the standard size data block is present in a Bad Block Table.

15. The computer program product of claim 14 wherein said computer-executable logic allows for the computer to perform the step of:
testing at least a subset of the standard size data block to determine if the contents of the subset match the logically bad pattern.

16. The computer program product of claim 15 wherein the logically bad pattern has a first predefined data portion and a second predefined data portion.

17. The computer program product of claim 16 wherein the logically bad pattern is repeated the requisite number of instances to fill the standard size data block.

18. The computer program product of claim 17 wherein the first predefined data portion is the American Standard Code for Information Interchange (ASCII) representation for "POSSIBLYLOGICALLYBAD".

19. A computer program product including signal-bearing storage media comprising:
a logically bad pattern having a first predefined data portion and a second predefined data portion repeated the requisite number of instances to fill a standard size data block.

20. The computer program product of claim 19 wherein the first predefined data portion is the American Standard Code for Information Interchange (ASCII) representation for "POSSIBLYLOGICALLYBAD".

* * * * *